(12) United States Patent
Beaudrie

(10) Patent No.: US 6,543,824 B2
(45) Date of Patent: Apr. 8, 2003

(54) FIRE-FIGHTING TOOL

(76) Inventor: John P. Beaudrie, 6644 S. Huron River Dr., South Rockwood, MI (US) 48179

( * ) Notice: Subject to any disclaimer, the term of this patent is extended or adjusted under 35 U.S.C. 154(b) by 0 days.

(21) Appl. No.: 09/951,375

(22) Filed: Sep. 13, 2001

(65) Prior Publication Data

US 2002/0030369 A1 Mar. 14, 2002

Related U.S. Application Data

(60) Provisional application No. 60/232,263, filed on Sep. 14, 2000.

(51) Int. Cl.[7] ................................................ B25J 1/00
(52) U.S. Cl. ........................ 294/24; 294/19.1; 294/104; 7/161
(58) Field of Search ........................... 294/17, 19.1, 24, 294/26, 50.8, 50.9, 104, 19.3; 7/159, 161, 166; 254/131; 30/144, 190, 251

(56) References Cited

U.S. PATENT DOCUMENTS

| | | | |
|---|---|---|---|
| 245,122 A | | 8/1881 | Bishop |
| 465,222 A | * | 12/1891 | Ulbricht ..................... 294/104 |
| 1,519,938 A | | 12/1924 | Smith |
| 1,751,481 A | * | 3/1930 | Tourrette ................... 294/50.9 |
| 1,777,395 A | * | 10/1930 | Coon ......................... 294/19.1 |
| 2,273,812 A | * | 2/1942 | Banta ......................... 294/50.9 |
| 2,279,809 A | | 4/1942 | Apfel |
| 2,749,088 A | * | 6/1956 | Jennens ....................... 254/132 |
| 2,759,758 A | * | 8/1956 | Yancey ......................... 294/104 |
| 2,791,462 A | * | 5/1957 | Solway ........................ 172/375 |
| 3,208,786 A | * | 9/1965 | Eddleman ................... 294/19.3 |
| 3,667,798 A | | 6/1972 | Rusztowicz |
| 4,597,123 A | * | 7/1986 | Cobe, Jr. ........................ 7/138 |
| 5,033,140 A | * | 7/1991 | Chen et al. ..................... 7/127 |
| 5,192,104 A | | 3/1993 | Lin |
| 5,232,256 A | | 8/1993 | Forbes |
| 5,428,853 A | * | 7/1995 | Menke et al. ................... 7/138 |
| 5,823,590 A | | 10/1998 | Forrest et al. |
| 5,845,354 A | * | 12/1998 | Long et al. ..................... 7/139 |
| 5,941,587 A | | 8/1999 | Wolff et al. |

* cited by examiner

*Primary Examiner*—Dean J. Kramer
(74) *Attorney, Agent, or Firm*—Price, Heneveld, Cooper, Dewitt & Litton

(57) ABSTRACT

A fire-fighting tool that is useful for penetrating building structures includes a shaft, a building penetration implement on a distal end of the shaft. The penetration implement includes a first jaw fixed to the shaft and a second jaw that is moveable relative to the first jaw to facilitate gripping of objects between the jaws. A lever at the distal end of the shaft is mechanically linked to the moveable jaw to facilitate remote operation of the gripping jaws. The fixed jaw also includes sharply pointed prongs for prying or sawing building materials.

12 Claims, 1 Drawing Sheet

FIRE-FIGHTING TOOL

CROSS-REFERENCE TO RELATED APPLICATION

This application claims priority under 35 U.S.C. § 119(e) on U.S. Provisional Application No. 60/232,263 entitled FIRE-FIGHTING TOOL, filed Sep. 14, 2000, by John F. Beaudrie, the entire disclosure of which is incorporated herein by reference.

FIELD OF THE INVENTION

This invention relates to hand tools, and more particularly fire-fighting tools for penetrating building structures to provide an opening to allow access to a fire.

BACKGROUND OF THE INVENTION

During the course of fighting a fire it is often desirable to penetrate building structures, such as exterior walls, interior walls, ceilings and roofs, to gain access to the fire. For example, it is often desirable to remove building siding, plywood, and the like from an exterior wall of a building to create an opening in the exterior wall so that water can be sprayed into the building through the opening or penetration in the building wall.

Heretofore, firefighters have in general used tools comprising a sharply pointed hook at the end of a long pole for tearing down building siding, plywood, and the like. Typically, this tool is used to tear or pull down siding or the like by engaging the pointed end of the hook with an upper edge of the siding or other building material and pulling downwardly to pry or tear the building material from the building. Often, it is possible to pry the upper edge of material away from the building while the lower edge of the material remains fixed to the building. When this occurs, it is sometimes extremely difficult to remove the material from the building because the hook portion of the tool only slides along a surface of the material and is incapable of engaging an edge of the material. On these occasions, it would be highly desirable to be able to grasp an edge of the material and pull it away from the building wall. However, the tools conventionally employed by firefighters for providing a building penetration are not capable of grasping an edge of a sheet of building material.

SUMMARY OF THE INVENTION

The invention overcomes the problems associated with conventional fire-fighting tools used for penetrating building structures to provide an opening to allow access to a fire. Such problems are overcome by providing a tool that includes at least one pointed projection for prying and/or tearing building materials from a wall or other building structure, and a gripping device for grasping an edge of the material. This allows a firefighter to use a single tool for hooking materials and for grasping materials, wherein only a slight adjustment of the position of the head of the tool is required to switch from utilization of the hooking implement to utilization of the gripping implement.

The fire-fighting tool of this invention includes an elongate shaft and a building penetration implement attached to a distal end of the elongate shaft, wherein the building penetration implement includes a pair of jaws that are movable with respect to each other for releasably gripping an object, the jaws having opposing toothed surfaces for biting into an object gripped between the jaws, and at least one sharply pointed prong that extends from an edge of a first of the jaws that is opposite of the toothed surface of the first jaw.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
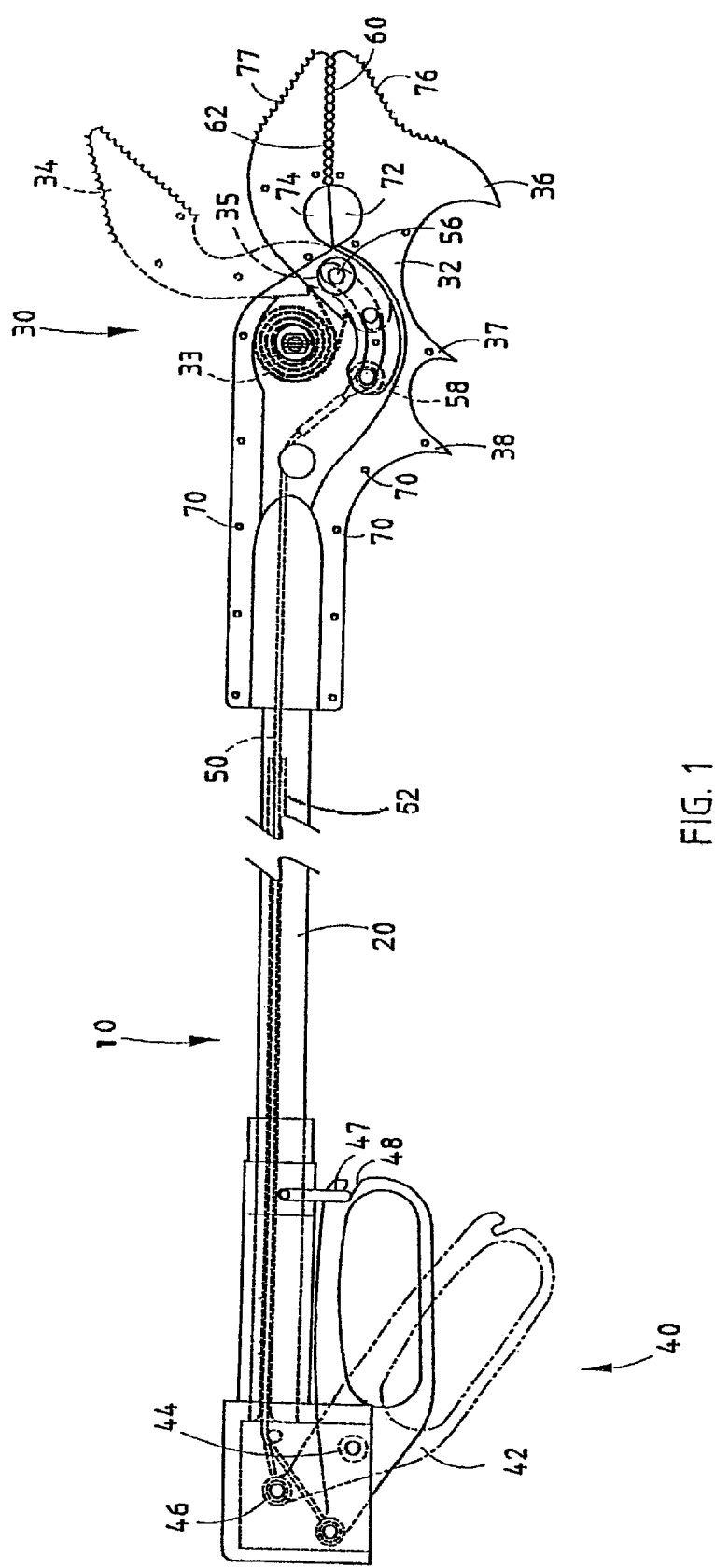
FIG. 1 is a fragmented elevational view of a fire-fighting tool according to the invention.

An embodiment of the fire-fighting tool 10, of this invention is illustrated in FIG. 1. Fire-fighting tool 10 includes an elongate shaft 20, a building penetration implement 30 attached to a distal end of elongate shaft 20, and a handle section 40 located at the opposite, proximal end of shaft 20. Elongate shaft 20 may be provided in various lengths, depending on the application. For example, a suitable shaft length for interior applications may be about six feet, whereas a suitable length for exterior applications may be about 10 or 12 feet. However, longer or shorter shafts may be used if desired.

Building penetration implement 30 of the illustrated embodiment includes a fixed jaw 32 that is fixed to a distal end of shaft 20, and a jaw 34 that is movable with respect to fixed jaw 32. In the illustrated embodiment, movable jaw 34 can be translated and rotated between an open position as indicated by the dashed lines, and a closed position as indicated by the solid lines. In the illustrated embodiment, movable jaw 34 includes a guide slot 35 which guides movement of jaw 34 between the open and closed positions. More specifically, the edges of slot 35 bear against a pivot or bearing point 56 as jaw 34 is moved between the open and closed positions. However, it should be understood that the invention may also encompass an arrangement wherein a movable jaw is movable between an open position and a closed position via translational movement alone or via rotational movement alone. Further, the invention may also encompass fire-fighting tools wherein both jaws are movable with respect to the shaft.

Handle section 40 includes an actuator lever (shown by solid lines when the jaws are in the closed position and shown by dashed lines when the jaws are in the open position). Lever 42 is hinged to shaft 20 at a location proximate the proximal end of shaft 20 to allow pivoting of lever 42 about an axle 44.

Lever 42 is mechanically linked with movable jaw 34 to allow movement of jaw 34 with respect to jaw 32 by manipulation of lever 42. In the illustrated embodiment, a cable 50 is threaded through shaft 20 and connects an end 46 of lever 42 with an end 58 of jaw 34 to provide a linkage that effects operation of jaw 34 for gripping and releasing objects when lever 42 is operated. As shown in the illustrated embodiment, at least a portion of the cable 50 (which could be made of steel) may be replaced with an electrically non-conductive rod 52 to prevent an electrical current from passing from the jaws to the handle through cable 50. A suitable rod may be made from synthetic resinous plastic material, such as Delrin® material. Other mechanical linking devices, such as a push rod linkage or the like, may be used, including linkages comprising gear and rotating shaft arrangements.

A lever lock 47 may be provided to engage a notch 48 in handle 40 to lock handle 40 in a position corresponding with a closed, gripping position of jaws 32 and 34, whereby a firefighter may concentrate efforts on pulling down a gripped object without having to apply pressure on handle 40. Lever lock 47 may be a ring or hook pivotally connected to shaft 20, and may be spring biased into the illustrated position so that the distal end of lever lock 47 slides along the rounded forward edge of handle 40 and snaps into notch 48 when lever 40 is rotated into the illustrated position corresponding with the closed position of jaws 32 and 34. This allows locking of the jaws in a closed position without manipulation of lever lock 47.

In the illustrated embodiment, movable jaw 34 is biased in an open position (indicated by the dashed lines) by a coil spring 33. The end of coil spring 33 that is located on the inside of the coil is fixed to fixed jaw 32 and the other end at the outside of coil spring 33 may be hooked into a slot on movable jaw 34. Although the illustrated tool 10 is provided with a spring 33 for biasing jaw 34 in an open position, it will be understood that alternative linkage mechanisms may be utilized in which a biasing spring is unnecessary. Further, as an alternative, the mechanical linkage between lever 42 and movable jaw 34 can be reconfigured so that operation of lever 42 is against a spring that biases jaw 34 in the closed position rather than the open position.

In the illustrated embodiment, fixed jaw 32 includes a plurality of sharply pointed prongs 36, 37 and 38 which can be used for engaging the edge of building material and prying the material loose from the building structure. Each of prongs 36, 37 and 38 projects outwardly away from jaw 32 and is angled slightly toward handle 40 of tool 10. A single prong may be used if desired, however, it is often desirable to provide a variety of different sized prongs and prongs which allow engagement with the building material at different angles. Further, middle prong 37 can act as a fulcrum in those cases where the material being pried from the building is engaged by distal prong 36, and proximal prong 38 can serve as a fulcrum when the building material is engaged by center prong 37. Prongs 37 and 38 may be used as a saw to cut downwardly through drywall or other building materials. A suitable distance from the distal tip of jaw 32 to the tip of prong 36 is from about 3 to about 4 inches (e.g., 3½), from about 3 to about 4 inches (e.g., 3½) from the tip of prong 36 to the tip of prong 37, and from about 1½ to about 2 inches from the tip of prong 37 to the tip of prong 38.

Fixed jaw 32 includes a toothed surface 60 that opposes a toothed surface 62 on movable jaw 34. The opposing toothed surfaces are capable of biting into an object to facilitate a firm grip on an object grasped between the fixed jaw 32 and the movable jaw 34.

A variety of materials are suitable for fabricating tool 10. However, strength, heat resistance, durability, and fire resistance are highly desirable properties for a fire-fighting tool. Suitable components for fire-fighting tool 10 may be fabricated from steel or other metals or alloys. Jaws 32 and 34 may, for example, be made of 16 gauge steel flat stock. This provides the desired strength, durability, heat resistance and fire resistance, while avoiding undesirable excessive weight or expense. The parts of jaw 32 are preferably cold riveted together with ends of rivets 70 rolled down to avoid protruding fasteners.

Steel wire cutting blades 72 and 74 may be attached to jaws 32 and 34, respectively, to facilitate cutting of electrical wires, phone lines, etc.

The rounded forward edges of jaws 32 and 34 may have serrated sections 76 and 77 to provide a ripping and/or tearing function that facilitates penetration of drywall or other building materials.

Typically, tool 10 will be used by first engaging a top edge of a building material, such as plank of building siding, with one of prongs 36, 37 or 38 and pulling downwardly, to rip the material from the building. Thereafter, if necessary, an exposed edge of the material may be grasped between jaws 32 and 34 by appropriate positioning of tool 10 and manipulation of handle 42.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A fire-fighting tool for penetrating a building structure to provide an opening to allow access to a fire, comprising:
   an elongate shaft;
   a building penetration implement attached to a distal end of the elongate shaft, the building penetration implement including opposing jaws moveable with respect to each other for releasably gripping an object, the jaws having opposing toothed surfaces for biting into an object gripped between the jaws, the jaws being configured to achieve engagement of the opposing toothed surfaces along a line coinciding with a longitudinal direction of the elongate shaft; and
   a plurality of sharply pointed prongs extending from an edge of a first of the jaws that is opposite of the toothed surface of the first jaw.

2. The fire-fighting tool of claim 1, wherein one of the jaws is fixed to the elongate shaft, and the other jaw is movable with respect to the fixed jaw.

3. The fire-fighting tool of claim 1, further comprising a lever hinged to the shaft at a location proximate to the proximal end of the shaft, and a mechanical linkage operably connecting the lever with at least one of the jaws to allow controlled movement of one of the jaws with respect to the other jaw.

4. The fire-fighting tool of claim 3, wherein the mechanical linkage is a cable.

5. The fire-fighting tool of claim 3, wherein a lever lock is provided to lock the lever in a position corresponding with a closed position of the jaws.

6. The fire-fighting tool of claim 1, wherein the jaws are biased apart by a spring.

7. The fire-fighting tool of claim 1, wherein a steel wire-cutter blade is attached to each of the jaws in opposing relationship, whereby the tool can be used as a wire-cutter.

8. A fire-fighting tool for penetrating a building structure to provide an opening to allow access to a fire, comprising:

an elongate shaft;

a building penetration implement attached to a distal end of the elongate shaft, the building penetration implement including opposing jaws moveable with respect to each other for releasably gripping an object, the jaws having opposing toothed surfaces for biting into an object gripped between the jaws, each of the jaws defining a rounded distal edge having a serrated section to provide a ripping function that facilitates penetration of building materials; and a plurality of sharply pointed prongs extending from an edge of a first of the jaws that is opposite of the toothed surface of the first jaw.

9. The fire-fighting tool of claim 8, further comprising a lever hinged to the shaft at a location proximate to the proximal end of the shaft, and a mechanical linkage operably connecting the lever with at least one of the jaws to allow controlled movement of one of the jaws with respect to the other jaw.

10. The fire-fighting tool of claim 9, wherein a lever lock is provided to lock the lever in a position corresponding with a closed position of the jaws.

11. The fire-fighting tool of claim 8, wherein the jaws are biased apart by a spring.

12. The fire-fighting tool of claim 8, wherein a steel wire-cutter blade is attached to each of the jaws in opposing relationship, whereby the tool can be used as a wire-cutter.

* * * * *